United States Patent
Reynolds et al.

(10) Patent No.: US 10,791,005 B2
(45) Date of Patent: Sep. 29, 2020

(54) BRIDGING ACCESSIBLE AND NON-ACCESSIBLE PACKET CORES

(71) Applicant: OXIO CORPORATION, New York, NY (US)

(72) Inventors: Tyler Beauchamp Reynolds, Washington, DC (US); Stephen Donald Hall, Providence, RI (US); Cory Francis Poor Myers, Washington, VT (US); John Garhowe Tam, Old Westbury, NY (US)

(73) Assignee: OXIO CORPORATION, New York, NY (US)

( * ) Notice: Subject to any disclaimer, the term of this patent is extended or adjusted under 35 U.S.C. 154(b) by 0 days.

(21) Appl. No.: 16/120,697

(22) Filed: Sep. 4, 2018

(65) Prior Publication Data

US 2019/0013970 A1    Jan. 10, 2019

Related U.S. Application Data

(63) Continuation-in-part of application No. 14/754,688, filed on Jun. 30, 2015, now Pat. No. 10,142,444.
(Continued)

(51) Int. Cl.
*H04L 12/66* (2006.01)
*H04L 12/46* (2006.01)
*H04L 29/12* (2006.01)

(52) U.S. Cl.
CPC .......... *H04L 12/66* (2013.01); *H04L 12/4625* (2013.01); *H04L 12/4641* (2013.01); *H04L 61/2007* (2013.01)

(58) Field of Classification Search
CPC combination set(s) only.
See application file for complete search history.

(56) References Cited

U.S. PATENT DOCUMENTS 7,958,184 B2   6/2011   Barsness et al.
8,166,187 B2   4/2012   Gowda
(Continued)

FOREIGN PATENT DOCUMENTS

WO   2009109478 A1   9/2009

OTHER PUBLICATIONS

Pfaff, B. et al. "Extending Networking into the Virtualization Layer." In Hotnets. 2009. Oct. 22, 2009. Retrieved from the Internet: http://www.openvswitch.org/support/papers/hotnets2009.pdf (Retrieved on Mar. 3, 2020), cited in See ISR for PCT/US2018/049349.
(Continued)

*Primary Examiner* — El Hadji M Sall
(74) *Attorney, Agent, or Firm* — Siritzky Law, PLLC

(57) ABSTRACT

A method in a computer network in which a user equipment (UE) connects to multiple packet cores, wherein each of said multiple packet cores assigns the UE a corresponding network address, the method comprising: (A) a virtual gateway associating a first network address with said UE and providing the UE with a second network address for communicating with and/or through said virtual gateway, said first network address and said second network address being distinct from the network addresses assigned to the UE by the packet cores; and (B) said virtual gateway communicating with said UE via one or more of said multiple packet cores, wherein the virtual gateway and the UE communicate using the first network address and the second network address, and wherein the virtual gateway acts as a gateway for the UE.

40 Claims, 8 Drawing Sheets

Related U.S. Application Data which is a continuation of application No. PCT/US2015/038251, filed on Jun. 29, 2015.

(60) Provisional application No. 62/554,256, filed on Sep. 5, 2017, provisional application No. 62/185,717, filed on Jun. 28, 2015, provisional application No. 62/019,545, filed on Jul. 1, 2014.

(56) References Cited

U.S. PATENT DOCUMENTS

| | | |
|---|---|---|
| 9,432,287 B2 | 7/2016 | Benny |
| 9,750,070 B2 | 8/2017 | Kim |
| 9,923,732 B2 | 3/2018 | Benny |
| 2009/0228541 A1 | 9/2009 | Barsness et al. |
| 2010/0189117 A1 | 7/2010 | Gowda |
| 2013/0097418 A1* | 4/2013 | Bhatt ............... H04L 63/0892 713/151 |
| 2014/0086253 A1 | 3/2014 | Yong |
| 2014/0269709 A1 | 9/2014 | Benny |
| 2015/0282026 A1* | 10/2015 | Gupta ............... H04W 76/14 370/331 |
| 2016/0007402 A1 | 1/2016 | Kim |
| 2018/0248983 A1 | 7/2018 | Mohebbi |

OTHER PUBLICATIONS

WIPO, International Search Report, PCT/US2018/049349, dated Dec. 26, 2018 [4 pgs.].
WIPO, Written Opinion of the International Searching Authority, PCT/US2018/049349, dated Dec. 26, 2018 [4 pgs.].

* cited by examiner

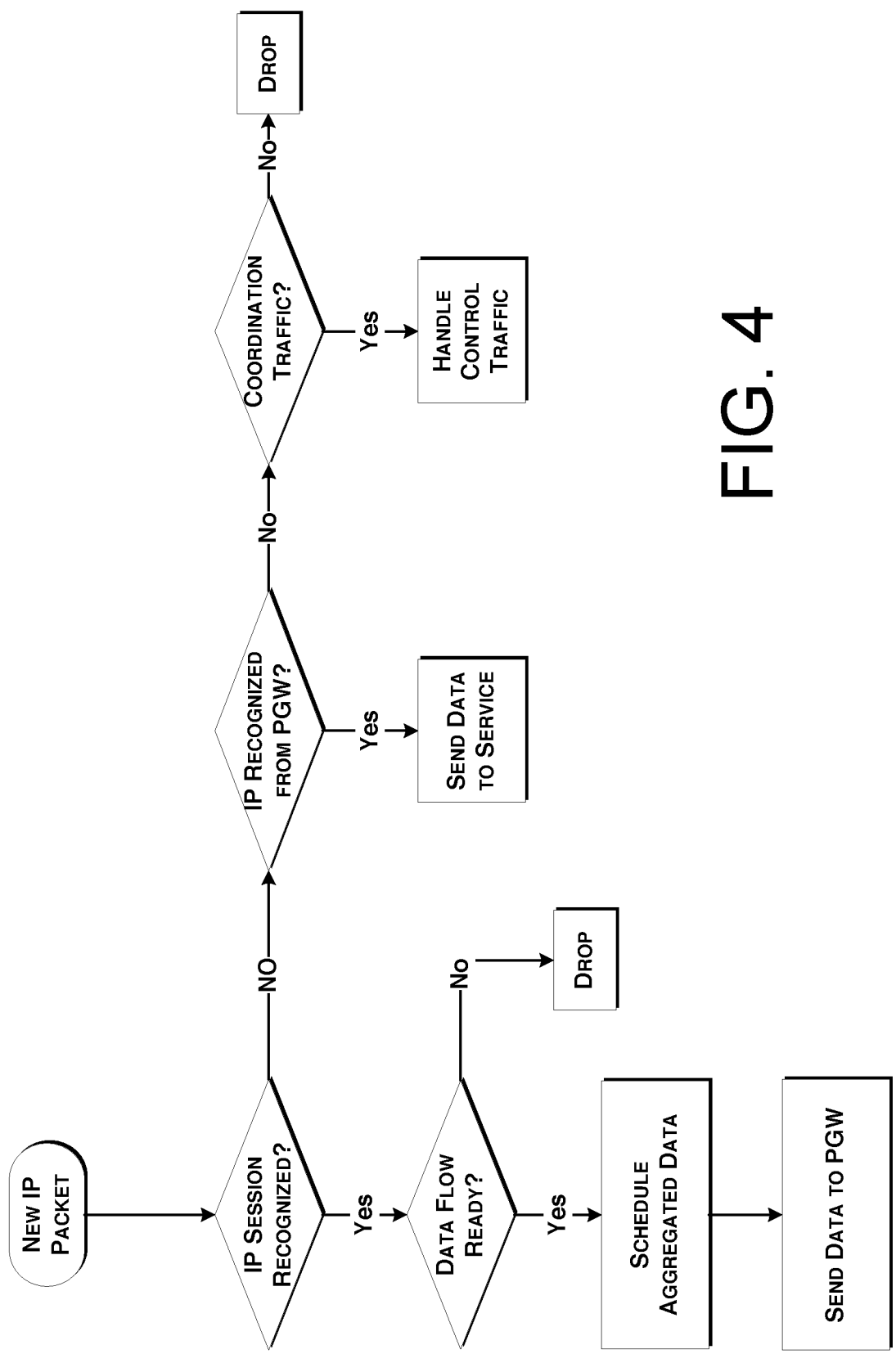

BRIDGING ACCESSIBLE AND NON-ACCESSIBLE PACKET CORES

RELATED APPLICATIONS

This application claims priority from U.S. Provisional patent application 62/554,256, filed Sep. 5, 2017, titled "Method for Bridging Accessible and Non-Accessible Packet Cores," the entire contents of which are hereby fully incorporated herein by reference in their entirety and for all purposes.

This application is a continuation-in-part (CIP) of U.S. patent application Ser. No. 14/754,688, filed Jun. 30, 2015, published Aug. 10, 2017 as US 20160006837 A1 on Jan. 7, 2016, which is a continuation of International Patent Application number PCT/US15/38251, filed Jun. 29, 2015, the entire contents of which are hereby fully incorporated herein by reference herein in their entirety and for all purposes.

Application number PCT/US15/38251 claims priority from (i) U.S. Provisional Patent Application No. 62/019,545, filed Jul. 1, 2014, titled "Method And System For Implementing A Dynamic Wireless Mesh Network," and (ii) U.S. Provisional Patent Application No. 62/185,717, filed Jun. 28, 2015, titled "Methods, Devices, And Systems For Implementing Centralized Hybrid Wireless Self-Organizing Networks," the entire contents of each of which are fully incorporated by reference herein in their entirety and for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to computer networks, and, more particularly to systems, methods and devices for bridging packet cores.

BACKGROUND

Wireless service is now provided using a combination of licensed, unlicensed, and shared spectrum. As mobile devices and wireless networks have proliferated, it is typical for a single device to use multiple networks owned or operated by different providers. Every wired and wireless network used by a device may use a different series of technologies know as the "networking stack" to transfer information between devices and networks.

Many mobile networks use a packet core architecture where a UE (User equipment) joins or authenticates with the radio network at the MAC (Media Access Control) layer. An IP (Internet Protocol) address is assigned to the device for the lifetime of the session with the radio network. As the device moves throughout the coverage of the radio network, IP continuity is maintained while the device transitions between cells operating in different locations or frequencies. This is a typical approach in the case of Wi-Fi using 802.11r and the 3GPP LTE standard. In such cases, transitions between cells or access points (APs) are transparent to the IP session. This transparency also makes these transitions transparent to the user of the UE.

One of the primary limitations to this approach is that the MAC layer is responsible for anchoring the device on the radio network, and the IP address of the device is assigned such that the UE may roam seamlessly around the provider network only. Often, the MAC layer is integrated tightly with hardware, proprietary implementations, or protocols that make transitions to other networks challenging or impossible at this level.

A common approach to bridge or unify two or more packet cores involves switching between the independent stacks as shown in FIG. 1. Often this switching is driven by the end-user or a component outside the individual stacks. This approach has a number of drawbacks which include the inaccuracy of when connection decisions should be made, the loss of IP continuity, a lack of operator-side control of the decision process, and fragility due to the dependence on the underlying networking stack.

Despite these limitations, packet-based networks have largely standardized around the Internet Protocol. The Internet, as a collection of services based around IP networks, is the primary focus of consumers and network providers and enjoys near universal compatibility across all networks, radio technologies, and UEs.

Link aggregation is a method of combining different links, usually across multiple network interfaces, for some benefit. These links may be part of the same network or different networks. For example, bandwidth may be aggregated between Wi-Fi and cellular networks to provide an overall faster throughput to the UE. Two Ethernet devices can also be "channel bonded" for high-reliability. Link aggregation may be implemented at many levels in the networking stack, each with their own benefits and tradeoffs.

Because of the wide-spread adoption of the Internet Protocol in software and devices, IP based link aggregation may be used on the Internet without additional hardware. Furthermore IP networks provide a routing infrastructure that may be leveraged for optimizations.

SUMMARY

Exemplary embodiments hereof provide a method for network providers to bridge one or more packet cores with an existing network (such as the internet) using IP based link aggregation. The approach allows for policy-based traffic steering between networks and packet cores that may otherwise be inaccessible to the operator.

In some aspects, exemplary embodiments hereof provide a method of using IP-based multi-path link aggregation to bridge two or more IP packet cores, primarily LTE (Long Term Evolution) packet cores. Through the use of a virtual gateway and IP-based link aggregation, multiple packets cores may be made to appear as a single network to applications on the UE and to services on the Internet. By unifying multiple IP addresses into a single IP address according to exemplary embodiments hereof, a unified network that provides uninterrupted roaming between managed radio networks, policy-based multi-path routing and analytics may be achieved. Exemplary embodiments do not require the consent or participation of the owner/operator of the packet cores or the manufacturer of the UE.

The present invention is specified in the claims as well as in the below description. Preferred embodiments are particularly specified in the dependent claims and the description of various embodiments.

Below is a list of method or process embodiments. Those will be indicated with a letter "P".

P1. A method in a computer network in which a user equipment (UE) connects to multiple packet cores, wherein each of said multiple packet cores assigns the UE a corresponding network address, the method comprising:
- (A) a virtual gateway associating a first network address with said UE and providing the UE with a second network address for communicating with said virtual gateway, said first network address and said second network address being distinct from the network addresses assigned to the UE by the packet cores; and
- (B) said virtual gateway communicating with said UE via one or more of said multiple packet cores,
  wherein the virtual gateway and the UE communicate using the first network address and the second network address, and
  wherein the virtual gateway acts as a gateway for the UE.

P2. The method of embodiment P1, wherein the UE forms a virtual network between the UE and the virtual gateway.

P3. The method of embodiment P2, wherein the virtual network bridges the multiple packet cores.

P4. The method of any one of embodiments P1-P3, wherein at least one of the multiple packet cores is a non-accessible packet core.

P5. The method of any one of embodiments P1-P4, wherein at least one of the multiple packet cores is an accessible packet core.

P6. The method of any one of the preceding embodiments, wherein the network addresses are Internet Protocol (IP) addresses.

P7. The method of any one of the preceding embodiments, wherein the multiple packet cores consist of exactly two packet cores.

P8. The method of any one of the preceding embodiments, wherein, in response to receipt of a packet from said UE, said packet intended for a particular service, said virtual gateway forwarding said packet to said particular service.

P9. The method of embodiment P8, wherein said virtual gateway substitutes a destination network address with a network address of the particular service and substitutes a source address with a network address of the virtual gateway.

P10. The method of embodiments P8 or P9, wherein, in response to receipt by the virtual gateway of an inbound packet from a service, said inbound packet intended for said UE, the virtual gateway translates a destination address of the inbound packet to correspond to a path via at least one of the multiple packet cores.

P11. The method of embodiment P10, wherein the virtual gateway translates a destination address of the inbound packet to correspond to a path via one of the multiple packet cores.

P12. The method of embodiments P10 or P11, wherein the path is selected based on at least one network policy.

P13. The method of embodiment P12, wherein the at least one network policy changes in real time.

P14. The method of embodiments P12 or P13, wherein the at least one network policy is based on one or more of: cost, throughput, reliability, jitter, latency, and packet loss.

P15. The method of any one of the preceding embodiments, wherein the first network address and the second network address are within an overlay network managed by the virtual gateway.

P16. The method of any one of the preceding embodiments, wherein the first network address is the same as the second network address.

P17. The method of any one of the preceding embodiments, wherein the multiple packet cores include a packet core supporting 3.5 GHz connectivity.

P18. The method of any one of the preceding embodiments, wherein the multiple packet cores include a cellular packet core.

P19. The method of any one of the preceding embodiments, wherein the virtual gateway is located in one of the multiple packet cores.

P20. The method of any one of embodiments P1-P18, wherein the virtual gateway is located apart from the packet cores.

P21. The method of any one of embodiments P1-P20, wherein the first network address and/or the second network address are public addresses.

Below is a list of system embodiments. Those will be indicated with a letter "S".

S22. A virtual gateway system comprising at least one server constructed and adapted to:
- (a) associate a first network address with a user equipment (UE) and to provide the UE with a second network address for communicating with said virtual gateway, wherein each of a plurality of packet cores has assigned the UE a corresponding network address, and wherein said first network address and said second network address are distinct from any network addresses assigned to the UE by any packet cores; and
- (b) communicate with said UE via one or more of said plurality of packet cores,
  wherein the virtual gateway and the UE communicate using the first network address and the second network address, and
  wherein the virtual gateway acts as a gateway for the UE.

S23. The system of embodiment S22, wherein the UE forms a virtual network between the UE and the virtual gateway.

S24. The system of embodiment S22, wherein the virtual network bridges the plurality of packet cores.

S25. The system of any one of embodiments S22-S24, wherein at least one of the plurality of packet cores is a non-accessible packet core.

S26. The system of any one of embodiments S22-S25, wherein at least one of the plurality of packet cores is an accessible packet core.

S27. The system of any one of embodiments S22-S26, wherein the network addresses are Internet Protocol (IP) addresses.

S28. The system of any one of embodiments S22-S27, wherein the plurality of packet cores consist of exactly two packet cores.

S29. The system of any one of embodiments S22-S28, wherein said at least one server is further constructed and adapted to, in response to receipt of a packet from said UE, said packet intended for a particular service, forward said packet to said particular service.

S30. The system of embodiment S29, wherein said at least one server is further constructed and adapted to substitute a destination network address with a network address of the particular service and to substitute a source address with a network address of the virtual gateway.

S31. The system of embodiments S29 or S30, wherein said at least one server is further constructed and adapted to, in response to receipt by the virtual gateway of an inbound packet from a service, said inbound packet intended for said UE, translate a destination address of the inbound packet to correspond to a path via at least one of the plurality of packet cores.

S32. The system of embodiment S31, wherein the virtual gateway translates a destination address of the inbound packet to correspond to a path via one of the plurality of packet cores.

S33. The system of embodiments S31 or S32, wherein the path is selected based on at least one network policy.

S34. The system of embodiment S33, wherein the at least one network policy changes in real time.

S35. The system of embodiments S33 or S34, wherein the at least one network policy is based on one or more of: cost, throughput, reliability, jitter, latency, and packet loss.

S36. The system of any one of embodiments S22-S35, wherein the first network address and the second network address are within an overlay network managed by the virtual gateway.

S37. The system of any one of embodiments S22-S36, wherein the first network address is the same as the second network address.

S38. The system of any one of embodiments S22-S37, wherein the plurality of packet cores include a packet core supporting CBRS/3.5 GHz connectivity.

S39. The system of any one of embodiments S22-S38, wherein the plurality of packet cores include a cellular packet core.

S40. The system of any one of embodiments S22-S39, wherein the virtual gateway is located in one of the plurality of packet cores.

S41. The system of any one of embodiments S22-S40, wherein the virtual gateway is located apart from the packet cores.

S42. The system of any one of embodiments S22-S41, wherein the first network address and/or the second network address are public addresses.

Below are computer program product embodiments. Those will be indicated with a letter "C".

C43. A computer program product having computer readable instructions stored on non-transitory computer readable media, the computer readable instructions including instructions for implementing a computer-implemented method, said method comprising: the method of any one of embodiments P1-P21 on the system of any one of embodiments S22-S42.

The above features along with additional details of the invention are described further in the examples herein, which are intended to further illustrate the invention but are not intended to limit its scope in any way.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 4 is a flow chart showing decision logic of a virtual gateway according to exemplary embodiments hereof;

DETAILED DESCRIPTION OF THE PRESENTLY PREFERRED EXEMPLARY EMBODIMENTS

Glossary

Figure 1:
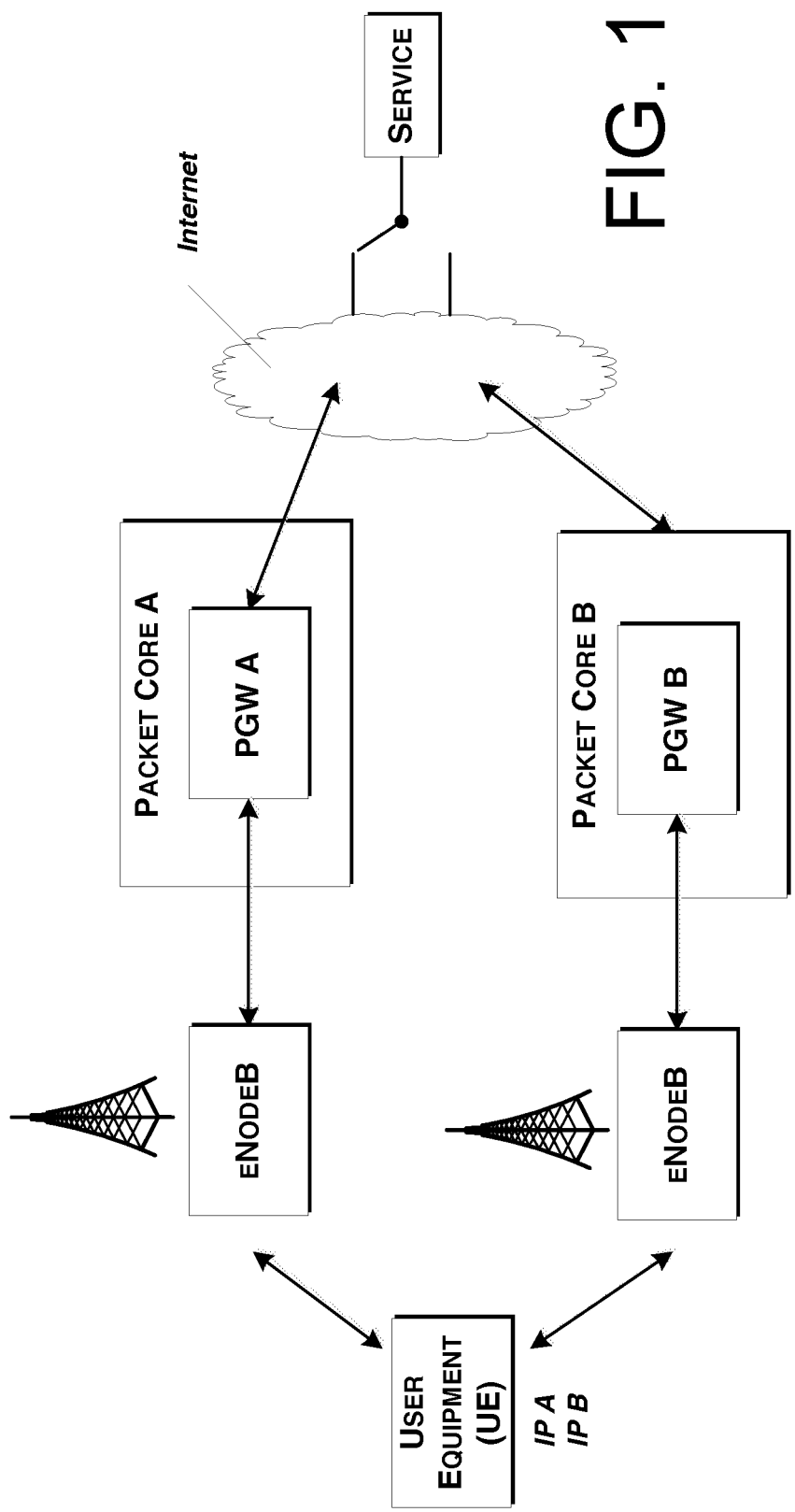
FIG. 1 depicts a conventional approach to bridging two packet cores by switching between them.

As used herein, unless used otherwise, the following terms or abbreviations have the following meanings:

AP means access point (generally referring to a device that allows or supports devices connecting to a network, e.g., using Wi-Fi, or related standards).

"Accessible" packet core means an evolved packet core within which an operator has the ability to move and manipulate the network functions of the core.

"Non-accessible" packet core means an evolved packet core within which an operator has no direct access, such as that of a competitor.

3GPP means 3rd Generation Partnership Project.

CBRS means Citizens Broadband Radio Service.

Cellular ("Cell") Network means a radio network composed of cells.

eNodeB or Evolved Node B refers to the hardware that is connected to a mobile phone network that communicates directly wirelessly with mobile handsets (UEs).

EPC means Evolved Packet Core, a set of functions for providing voice and data to mobile devices.

GRE means generic routing encapsulation.

Handoff means a transition from one network to another.

IMS means IP Multimedia Subsystem.

IP means Internet Protocol.

IPv4 means Internet Protocol Version 4.

IPv6 means Internet Protocol Version 6.

IP address means an address used in the Internet Protocol, including both IPv4 and IPv6, to identify electronic devices such as servers and the like.

IP continuity means maintaining a continuous IP session and address, specifically across interfaces or networks, for the purpose of uninterrupted connectivity.

LAA means Licensed Assisted Access.

LTE means Long Term Evolution.

LTE-U means LTE in unlicensed spectrum.

LWA means LTE WiFi Aggregation.

MAC means Media Access Control.

MVNO means mobile virtual network operator.

NIC means network interface card.

PDG or PGW means a Packet Data Gateway as commonly used in an LTE network.

QUIC means Quick UDP Internet Connections.

Subflow means a path taken by IP packets from an endpoint to one or more other endpoints.

UE means User equipment.

UDP means User Datagram Protocol.

VNO means virtual network operator.

VPN means virtual private network.

A "mechanism" refers to any device(s), process(es), routine(s), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

Other terms have their ordinary meaning unless otherwise defined.

Problem Statement

Existing technologies that provide handoffs between networks typically operate under a common packet core. However, these existing solutions do not allow network access through multiple packet cores simultaneously.

The primary limitation is the idea of an "anchor"—a packet core is designed to "anchor" an IP session in the packet core of the provider. As a device transitions ("roams") between cells within the provider network or roaming partners, IP traffic is still routed properly through the provider network.

The UE is typically configured with a single IP address from the network provider to make this possible. While the UE is connected to the provider's network the IP address is retained to preserve IP continuity across the radio network.

However when a device moves between wireless networks of different providers, the IP address of the UE changes and IP continuity is lost. Furthermore, if the UE is in range of multiple provider networks, and has sufficient hardware to connect to multiple networks, traffic from multiple packet cores cannot be combined into a single IP session.

Even with multiple interfaces, because a UE cannot establish a single IP session across multiple network interfaces or network providers, a myriad of problems for network operators as well as consumers results. Network operators cannot provide a "seamless handover" between different radios or networks. This is especially true when the IP session is anchored in the packet core of another operator.

Another disadvantage of existing networking technologies is their inability to combine two or more networks to aggregate bandwidth or offer fault-tolerance. Existing packet-core based systems offer end-to-end connectivity across separate providers, but because the connectivity is end-to-end an operator's ability to simultaneously make use of multiple links from separate providers is lost. Put simply, the UE can only retain an end-to-end connection with one packet core at a time.

Examples of Problems

One Interface, Different Networks (e.g. Cellular and CBRS)

Consider a device with one cellular network interface. Using existing solutions, it is not possible for a network operator to provide seamless handover between a packet core designated for CBRS (Citizens Broadband Radio Service) and a legacy packet core designed for other cellular spectrum. The cellular radio and networking stack on the UE will authenticate against one packet core and obtain an IP address from the cellular provider. Should the device switch to the CBRS band, the IP address will change based on the assignment from the provider of the CBRS network. This could impair the Internet connectivity of the device.

Two Interfaces, Different Networks (e.g. Cellular to CBRS)

Consider a device with one cellular network interface and a dedicated CBRS (3.5 GHz) network interface. The UE may power up both network interfaces at the same time, and receive IP address assignments from both provider networks. However, IP or MAC based link aggregation cannot be offered across those IP sessions or network interfaces because the IP sessions do not terminate in the same packet core or IP network. Directly interfacing the packet cores over their native interfaces may also be impossible without the explicit consent or configuration of the provider of the other Network core. As a result, the handset must choose which IP session to treat as the primary, but cannot see the benefits of aggregation of both provider networks together.

Limitations of Existing Aggregation Solutions

Non-IP Based Multi-Path Protocols

Other higher-level protocols like Multi-Path TCP (MPTCP) and QUIC offer per-application benefits for network transitions and aggregation but do not enable network providers IP-layer unification of one or more packet cores. Because these protocols operate at the transport level, it is challenging to account for and manage IP sessions across multiple subflows. Because a packet core typically operates atop IP networks, there is no direct method for interoperability. There is also a loss of control when policy-based routing is desired.

MAC Layer (Hardware) Based Solutions

LTE WiFi Aggregation (LWA) has been touted as a solution that can integrate WiFi and cellular networks. However, because LWA requires tight integration among the eNodeB, the WiFi AP, and the networking hardware and software stacks on the UE, deployment is challenging and expensive. This requires WiFi and cellular networks to operate on the same packet core so signaling can happen at the MAC layer. Proper placement and installation of the eNodeB and WiFi AP to coordinate the links concurrently with respect to latency, bandwidth availability, or other factors is usually required.

An entity proposing to "bridge" or "unite" packet cores using LWA will ultimately consolidate multiple packet cores into one core. Rather than leveraging both cores, the entity is simply operating different radio technologies under a single packet core. This option is suboptimal or impossible in situations where the owner has not granted access to the packet core, but access to the radio network is permitted. This is the typical case for a Mobile Virtual Network Operator (MVNO). This method is also sub-optimal when it involves retooling or moving the components of an existing packet core.

Description

Various solutions to the above-noted problems, recognized by the inventors, are described.

As used herein, UE refers to user equipment such as wireless telecommunications devices. A wireless telecommunications device refers to any device or entity or apparatus capable of data transmission and reception. Non-limiting examples of wireless telecommunications devices (and therefore of UE) include mobile phones (such as cell phones, smartphones, and the like). The terms UE and wireless telecommunications device are not limited by the communication protocols or systems used or by the type of data. The data may include or represent voice data, image data, text data, data, video data, etc.

Exemplary embodiments hereof provide a method for a service provider to bridge multiple packet cores through a combination of virtualized addressing, a routing scheme, and link aggregation. This approach may be performed "over-the-top" regardless of whether a provider has access to the packet cores or networks being combined. Embodiments of this approach do not require any software or hardware changes on any packet core nor do they require consent, knowledge, or active participation from the owner or operator of a packet core that is being bridged. This approach works for packet cores that may utilize the same network interface card (NIC) on a UE, such as two cellular EPCs (Evolved Packet Cores) or a cellular EPC and a CBRS-dedicated packet core, as well as for packet cores that use different network interfaces on a UE, such as an EPC and a WiFi packet core. The described approach works regardless of whether a UE has one network interface or multiple heterogeneous or homogenous network interfaces.

Notably, the method according to exemplary embodiments hereof may be repeatedly used such that an entity can combine packet cores that have already been combined. This method can also be used repeatedly to combine three or more packet cores into a single virtual network.

Embodiments hereof may anchor sessions and may redirect packets on a packet-by-packet basis, e.g., as described in U.S. published patent application 20160006837, (U.S. application Ser. No. 14/754,688) filed Jun. 30, 2015, published Jan. 7, 2016, titled "Methods, devices, and Systems for implementing centralized hybrid wireless self-organizing networks," the entire contents of which are hereby fully incorporated herein by reference in their entirety for all purposes.

Embodiments hereof may provide IP continuity between interfaces while a single interface is switching between radios operated by different packet cores.

Exemplary Implementation

Figure 2:
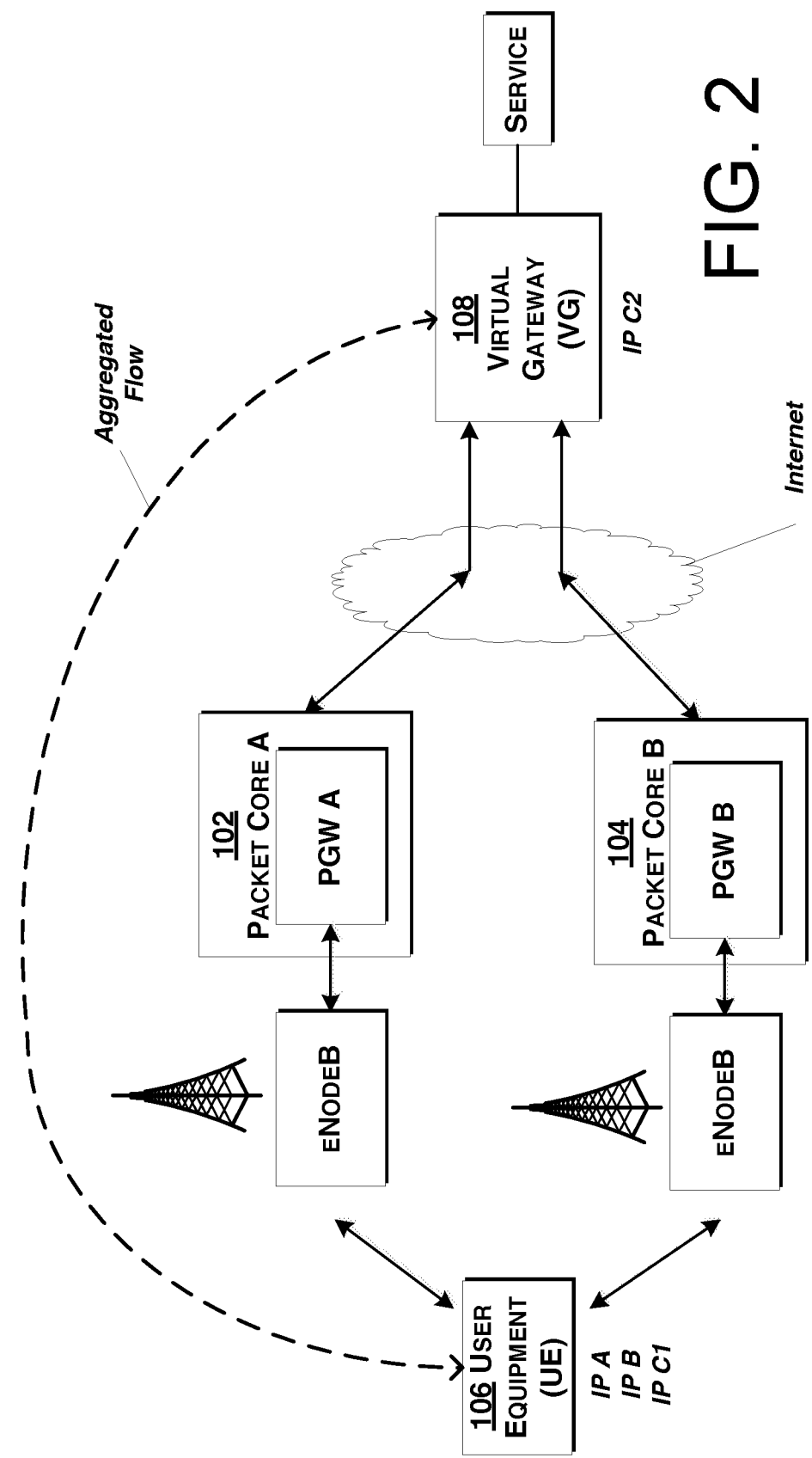
FIG. 2 depicts aspects of packet core bridging according to an exemplary embodiments hereof.

FIG. 2 shows aspects of an exemplary implementation of exemplary embodiments hereof in which two packet cores {Packet Core A 102, Packet Core B 104} operate in isolated networks. A UE 106 is connected to both packet cores simultaneously and is given a distinct IP address by each packet core, e.g., IP address A (IP A) from packet core A and IP address B (IP B) from packet core B.

A packet gateway (PGW) in each packet core anchors the IP session for each IP address assigned to the device for that packet core. Thus, packet gateway PGW A in packet core A anchors the IP session for the IP address IP A assigned to UE 106 by patent core A Similarly, packet gateway PGW B in packet core B anchors the IP session for the IP address IP B assigned to UE 106 by patent core B.

The virtual connection between the UE and the virtual gateway may be considered an overlay network. Thus, IP C1 and IP C2 may be considered to be network addresses in an overlay network managed by the virtual gateway.

A virtual gateway 108 may be located on the Internet outside the packet core network(s). Those of ordinary skill in the art will appreciate and understand, upon reading this description, that virtual gateway 108 may also be located within (or co-located with) one or more of the packet cores, provided that the virtual gateway 108 can route traffic to the other packet core(s) and to the Internet.

The virtual gateway 108 may assign and/or associate a network address to the UE 106 (e.g., IP C1 in FIG. 2). The virtual gateway 108 may be sent IP packets from both packet cores using IP address C2 (IP C2). The UE 106 may send packets to the virtual gateway 108 by sending IP packets through one or both packet gateways 102, 104 to the virtual gateway 108.

Those of ordinary skill in the art will appreciate and understand, upon reading this description, that network addresses IP C1 and IP C2 need not differ, and may, in some cases, be the same IP address (in other words IP C1 may equal IP C2). This would be the case, e.g., if the NAT were to be avoided.

The network addresses IP C1 and IP C2 may be public or private addresses.

Packets routed to the virtual gateway 108 from the UE are received at the virtual gateway. These packets are inspected and their source IP address and other identifying information (e.g., subnet, ISP, flow state information, etc.) may be used to identify the flows as originating from the UE 106 and through packet gateway PGW A and/or packet gateway PGW B. The two incoming flows may be aggregated using a common IP-based aggregation scheme (e.g., round-robin scheduling, congestion-based scheduling, primary-backup scheduling scheme, etc.). The virtual gateway 108 may process the packets (e.g. perform NAT, filtering, compression, queuing, throttling, etc.) and ultimately routes those packets back to the Internet along the aggregated flow.

It should be noted that the aggregated flow may, in some cases, be engineered to appear to other services on the Internet as originating from a single UE. This may be accomplished, e.g., by the virtual gateway 108 providing a consistent source IP address to services on the Internet and performing any address translation back to the IP addresses assigned by packet gateways PGW A and/or PGW B.

Coordination of the Virtual Gateway

For security and coordination, the UE may initiate a virtualized IP session with the virtual gateway for the purposes of policy management, IP allocation, encryption, route configuration, and accounting. The virtual gateway may perform these functions prior to aggregating the data flow, and/or may provide these facilities while the data flow is active.

Virtual Gateway Implementation

Operation of the virtual gateway 108 may be implemented by hardware and/or software running on that hardware. Although shown in the drawings as a single box, those of ordinary skill in the art will appreciate and understand, upon reading this description, that the virtual gateway 108 may be a computer system comprising one or more servers and the like. A computer system is described in greater detail below.

Although only one virtual gateway 108 is shown in the drawings, those of ordinary skill in the art will appreciate and understand, upon reading this description, that a system may include multiple virtual gateways.

Figure 3A:
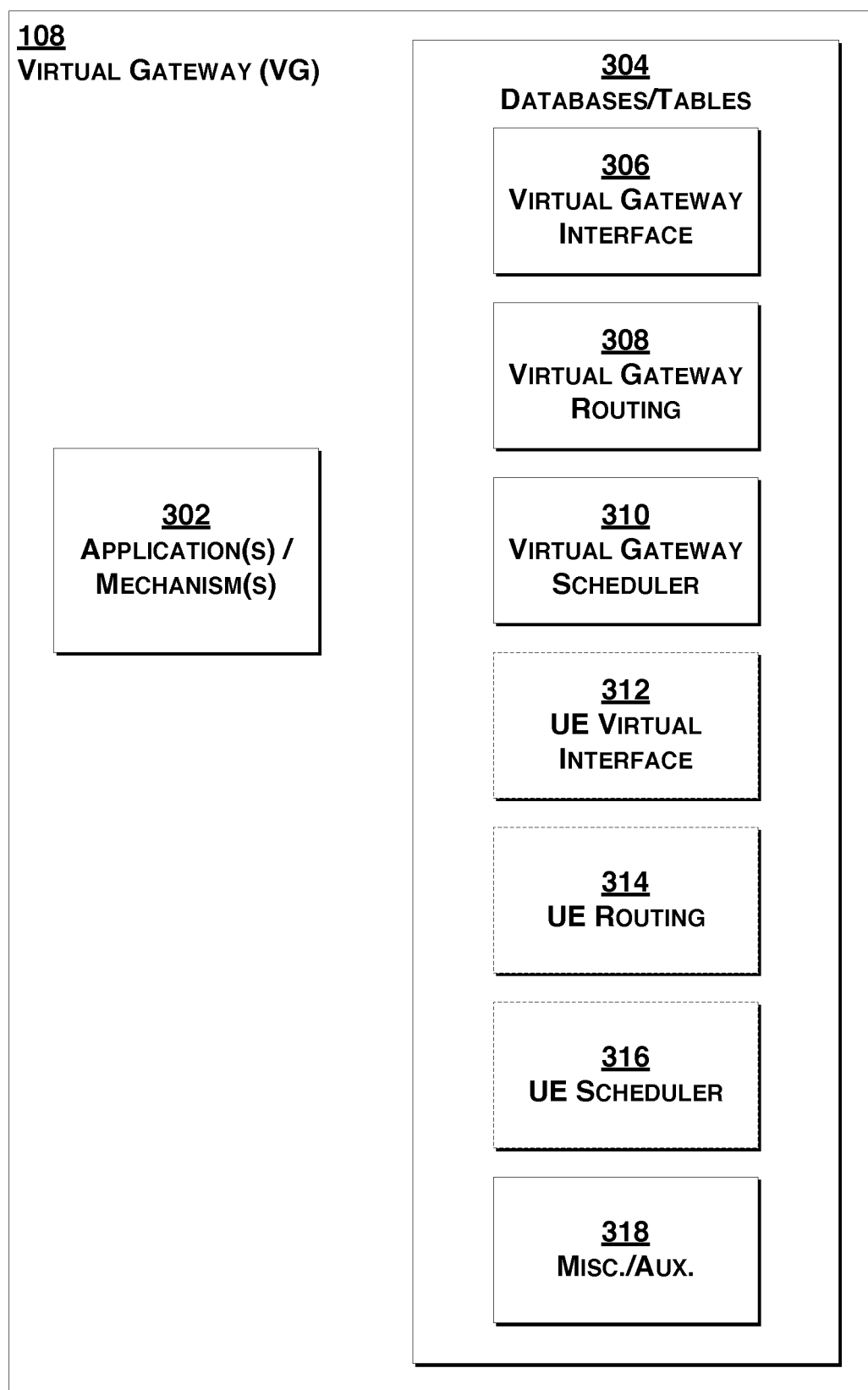
FIG. 3A shows aspects of a user equipment according to exemplary embodiments hereof.

The logical structure of an exemplary virtual gateway 108 is shown in FIG. 3A, in which the virtual gateway 108 may include one or more applications/mechanisms 302 and one or more databases 304. The databases 304 may have any structure, but, in a preferred implementation are maintained as tables in a memory of the virtual gateway 108. The tables may include: virtual gateway interface table(s) 306, virtual gateway routing table(s) 308, virtual gateway scheduler table(s) 310, and other miscellaneous/auxiliary table(s) 318. The tables may optionally include UE-related data (e.g., routing tables), including, e.g., UE virtual interface table(s) 312, UE routing table(s) 314, UE scheduler table(s) 316. Those of ordinary skill in the art will appreciate and understand, upon reading this description, that different and/or other tables may be used and that the logical structure shown in FIG. 3A is only one possible structure of the data.

Figure 3B:
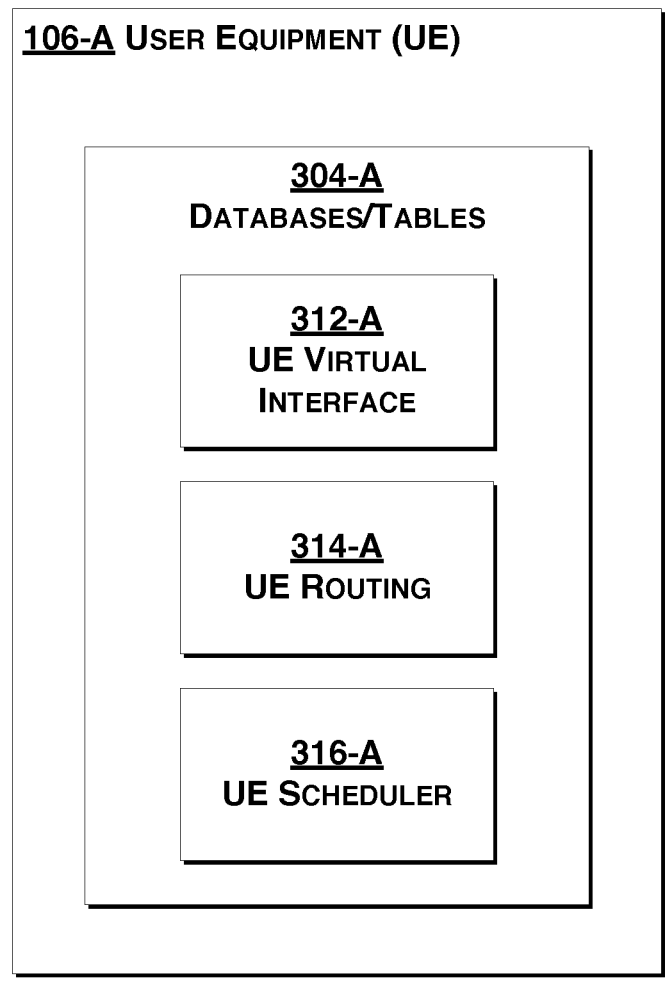
FIG. 3B shows aspects of a virtual gateway according to exemplary embodiments hereof.

UE tables/routing tables (e.g., UE virtual interface table(s) 312-A, UE routing table(s) 314-A, UE scheduler table(s) 316-A) may be located on the various UEs (such as UE 106-A, as shown in FIG. 3B).

As should be appreciated, a UE will only maintain its own routing tables/data, whereas a virtual gateway may store and maintain routing tables/data about multiple UEs. That is, a virtual gateway only needs its own routing table which may contain the address(es) and route(s) of the client(s).

The virtual gateway 108 may comprise a single computer, a network of computers, or a distributed system. There is no requirement that various components of the virtual gateway 108 be co-located or that the virtual gateway 108 be co-located. There is also no requirement that database(s) 304 be co-located with the server(s) or with each other.

An exemplary implementation of aspects of the logic of the applications/mechanisms 302 of the virtual gateway 108 is shown in the flowchart in FIG. 4. The flow chart illustrates an exemplary decision tree/process that may be used when a packet is received by the virtual gateway.

The packet is checked to determine if the destination matches any existing IP subflows that may be sent to the UE over the aggregated data connection. If so, the packet is scheduled and sent to the packet gateway (PGW) for routing to the UE. This may involve translating the address in the packet.

If the packet is recognized as coming from a known PGW for a particular UE, the packet may be routed to the service on the Internet. Again, the source address of the IP packet may be modified to be the address of the virtual gateway (e.g., IP C2 in the example in FIG. 2), so that packets sent from the service will be sent back to the gateway for aggregation.

Finally, the virtual gateway may handle control or coordination traffic from the UE, such as a key exchange, certification challenge, or other instructions.

It should be noted by one skilled in the art that the order of conditionals/branches in FIG. 4 is representative of one implementation. The same behavior may be implemented in other ways for an equivalent behavior.

Address Translation Specifics

To illustrate how addresses may be translated between the UE and packet cores, the setup of FIG. 2 may be elaborated by assigning example IP addresses to each component. An exemplary interface table and IP address for each component in the diagram in FIG. 2 is given below. Arbitrary IPv6 addresses are used for clarity and the IPv6 shorthand notation has been used that denotes the IPv6 address a000:0000:0000:0000:0000:0000:0000:0001 in the form a000::1.

UE
WiFi—a000::3 (connected to Packet Core A) [corresponds to IP A]
Cell—b000::3 (connected to Packet Core B) [corresponds to IP B]
Virtual IP—c000::3 [corresponds to IP C1]
Packet Core A
eNodeB-a000::2
PGW-a000::1
Packet Core B
eNodeB-b000::2
PGW-b000::1
Virtual Gateway
Gateway: c000::1
Virtual Client: c000::2 [corresponds to IP C2]
Service
Content: d000::1

With these example addresses, the databases/tables 304 in the virtual gateway 108 may include the following entries (the comments (after "#" symbols) are to aid in this description, and entries for other UEs are not shown):

| Virtual Gateway Interface Table 306 | | |
|---|---|---|
| Name | address | |
| tun0 | c000::2 | # virtual routing interface for client |
| eth0 | c000::1 | # public routing interface of the virtual gateway |

| Virtual Gateway Routing Table 308 | | |
|---|---|---|
| inbound | forward | |
| c000::1 | eth0 | |
| c000::/64 | tun0 | |
| 0::/0 | eth0 | # default route for virtual gateway |

| Virtual Gateway Scheduler 310 | |
|---|---|
| Read | schedule |
| tun0 | [a000::1 or b000::1] or send to service [d000::1] |

Each UE preferably includes the following data/tables (as noted above, the databases/tables in the virtual gateway may also, optionally, include these and other UE entries):

| UE Virtual Interface Table 312-A | | |
|---|---|---|
| Name | address | |
| tun0 | c000::3 | # virtual interface for aggregation/overlay network |
| eth0 | a000::3 | # interface to Packet Core A |
| eth1 | b000::3 | # interface to Packet Core B |

| UE Routing Table 314-A | | |
|---|---|---|
| Inbound | forward | |
| a000::/64 | eth0 | # route traffic for Packet Core A through eth0 |
| b000::/64 | eth1 | # route traffic for Packet Core B through eth1 |
| 0::/0 | tun0 | # default route sends unmatched UE traffic through virtual aggregation interface |

| UE Scheduler 316-A | |
|---|---|
| read | schedule |
| tun0 | [a000::1 or b000::1] or consume |

Using the approach described herein, the UE is assigned an IP address from Packet Core A, an IP address from Packet Core B, and an IP address from the virtual gateway.

When a data packet is sent from the UE to the service on the Internet, the typical packet is crafted as follows:
IP-DESTINATION: d000::1
IP-SOURCE: a000::3

Where it is assumed the primary route of the device is WiFi and the data will terminate in Packet Core A which acts as the anchor for the IP session. If PGW A performs network address translation (NAT), the content (Service) will receive a packet with the following form:
IP-DESTINATION: d000::1
IP-SOURCE: a000::1

Though similar, this packet has a source IP address matching PGW A, not the UE's Wi-Fi interface. Both approaches may be used to determine a suitable return route for any packets destined for the UE from the content (Service).

In the approach according to exemplary embodiments hereof, the UE will instead send the IP packet to the virtual gateway:
IP-DESTINATION: c000::1
IP-SOURCE: a000::3

The packet will be routed through Packet Core A to the virtual gateway, which will receive the packet as originating from either PGW A (a000::1) or the UE (a000::3). The service destination address d000::1 will be encapsulated inside the payload of the packet, added to the packet's header, or inside the destination or source address of the packet.

At the virtual gateway, the destination IP address will be substituted with that of the content (Service) and the IP-SOURCE will be substituted with an IP address managed by the virtual gateway:
IP-DESTINATION: d000::1
IP-SOURCE: c000::1

The packet will then be received by the content (Service) from the virtual gateway, and the return-hop for the response from the content (Service) will be understood to be the Virtual gateway as well.

Receiving Packets at the Virtual Gateway from a Service (e.g., Content Server)

Inbound packets to the virtual gateway from the service will take the form:
IP-DESTINATION: c000::1
IP-SOURCE: d000::1

Where the destination address corresponds to an address managed by the virtual gateway. The virtual gateway will again translate these packets and schedule these packets. Because there are two paths (through packet cores A and B), the virtual gateway may implement an aggregation strategy over the two paths and route the traffic to the UE on either the WiFi Address (a000::3) or the cellular address (b000::3)
IP-DESTINATION: (a000::3) or (b000::3)
IP-SOURCE: c000::1

The choice of address will determine which packet core the data will travel through. This method unifies the packet cores behind the single virtual address space controlled by the virtual gateway. Because this method is used during the routing of a packet, the individual packet cores are not affected or aware of the aggregation strategy. This gives the virtual gateway control over which core is used to route packets destined for the UE.

It should be noted that the virtual gateway need not use its own IP address and could also assign each UE connected through the virtual gateway its own unique virtual IP address in the c000::/64 address space (e.g., c000::2, c000::3, etc.). This allows a single virtual gateway to service multiple UEs, potentially connected through many unrelated packet cores, on distinct natively-assigned addresses, effectively routing their traffic rather than masquerading them behind a single gateway address.

As the UE may pass out-of-band information to the virtual gateway (e.g., through a direct connection between the UE and the virtual gateway), this channel may be used to identify and coordinate the content (Service) being targeted. Because the virtual gateway introduces a layer of indirection into the routing topology of the network, the next-hop information may be communicated to the virtual gateway using such a communication channel. An encapsulation or proxying strategy may also be used by the UE to pass this additional next-hop routing information to the virtual gateway. A simple GRE tunnel (or similar VPN protocol like IPSEC) would provide the next-hop routing information to the virtual gateway, rather than proxying all connections through it explicitly.

The virtual gateway may perform analysis on the data flowing between the UE and the individual packet cores. This analysis may inform an aggregation strategy about the health or performance of such flows, or inform the operator of the virtual gateway about the availability or costs associated with a particular path. The analysis may also provide identifying information about the operator of the packet core along that path or the location of the packet core. Those of ordinary skill in the art will appreciate and understand, upon reading this description, that any IP-level or higher flow metrics may provide valuable information to the virtual gateway.

As a result of this configuration, a bidirectional IP flow may be established between the content (service) and the UE. The IP flow may be composed of aggregated subflows routed through the respective packet cores, and access to the packet cores is not required to build a virtual network. From the perspective of the UE, a single macro IP flow is observed regardless of which packet core routes any particular packet. From the perspective of the content (service) a single flow is observed passing through the virtual gateway.

Avoiding Address Translation and Preserving End-to-End Precedents

Other exemplary embodiments hereof may avoid the address translation described above. This is desirable for network providers that wish to retain the benefits of end-to-end addressing and connectivity.

The approach described above may be modified to preserve end-to-end addressing by configuring one or more "accessible" PGW nodes to use the virtual gateway as their primary gateway. In addition, the virtual gateway must be configured to announce a block of public address space to the Internet for each client device that must be anchored inside the virtual gateway. The PGW may also require configuration to allow forwarding of IP packets matching the announced block.

The UE should be configured with a single software network interface matching the public address advertised by the virtual gateway.

Packets routed from the UE through any properly configured PGW will be forwarded upstream to its configured gateway, namely the virtual gateway. By treating the virtual gateway as the IP gateway for one or more PGWs, upstream packets from multiple packet cores may be directed through the virtual gateway to the Internet. Packets received by the virtual gateway will match an IP address inside the announced IP block, so individual clients can easily be identified.

Packets received by the virtual gateway from a remote service or the Internet will be destined for a single announced IP address inside the IP block announced by the virtual gateway. This allows the virtual gateway to identify the client and apply the logic described in the flowchart in FIG. 4. The virtual gateway can then select one or more PGWs through which packets may be sent. When a packet matching an announced address is received by the PGW, it may be forwarded through the packet core to the UE as if the packet was received from the public Internet and was routed to the UE through the PGW.

Extensions

Figure 5A:
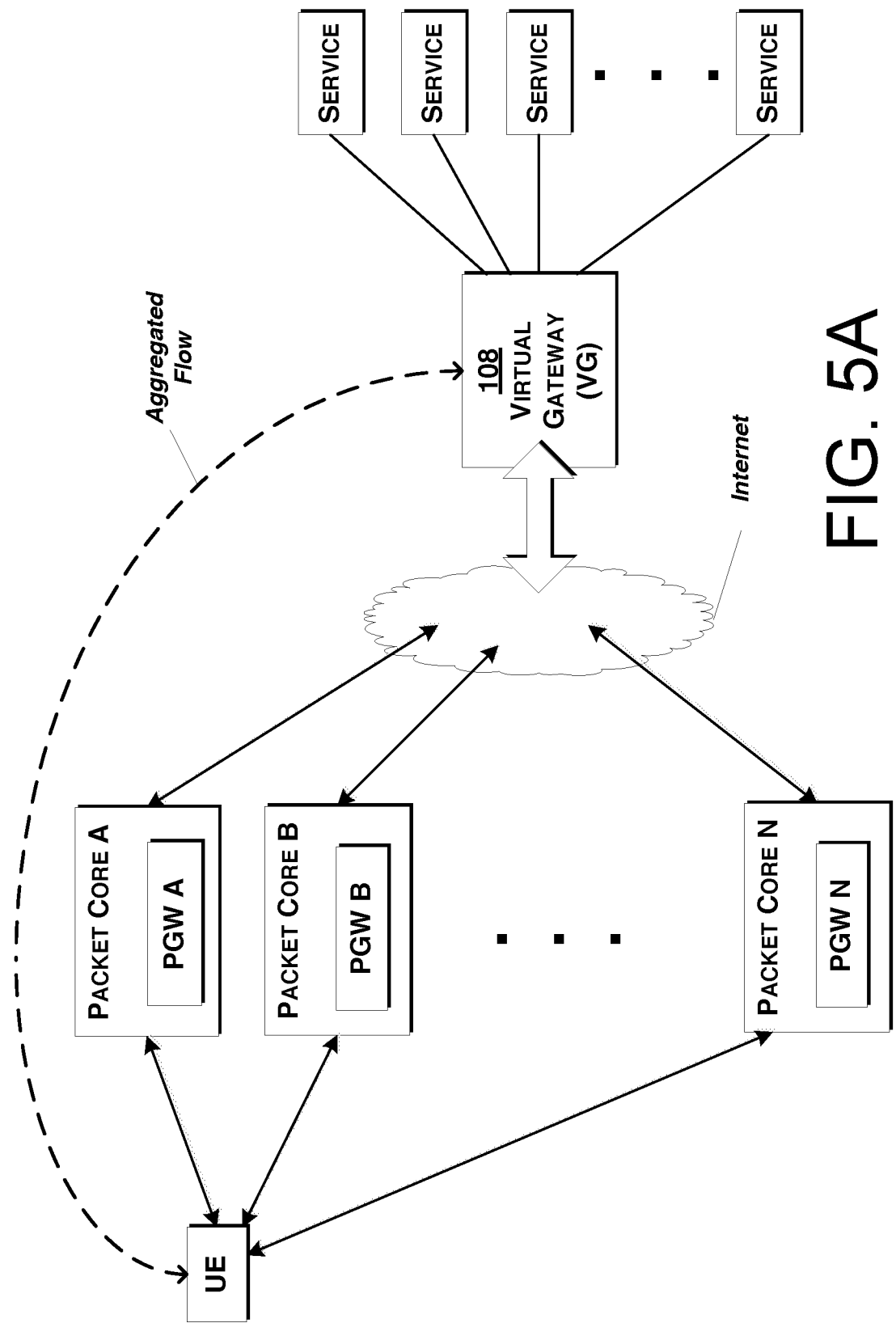
FIGS. 5A-5B depict aspects of packet core bridging according to exemplary embodiments hereof.

Although the above description and examples have used two packet cores, those of ordinary skill in the art will appreciate and understand, upon reading this description, that the process may be extended to three or more packets cores. For example, as shown in FIG. 5A, there may be multiple (e.g., N>2) packet cores, and a particular UE may have connection to more than two of those packet cores.

The implementation may be similar to that described above, where each additional packet core may be aggregated by the virtual gateway, and the virtual IP would be used by the UE for its data communication.

It should also be appreciated from the above description that the UE may additionally connect directly or indirectly to the virtual gateway using a non-packet core based network such as Wi-Fi, Ethernet, satellite, point-to-point, or other similar networking technologies.

Those of ordinary skill in the art will appreciate and understand, upon reading this description, that, in preferred implementations, at no point are physical (hardware) interfaces involved, and this aggregation strategy could be pursued over any combination of Wi-Fi, cellular, 3.5 GHz CBRS, or similar technologies.

It should also be noted that in the case of a single packet core, the proposed method essentially degrades to a topology similar to a VPN or intelligent router. The virtual gateway may still have a role in anchoring the IP flow of the UE and performing analysis on the subflow without making use of link aggregation.

Figure 5B:
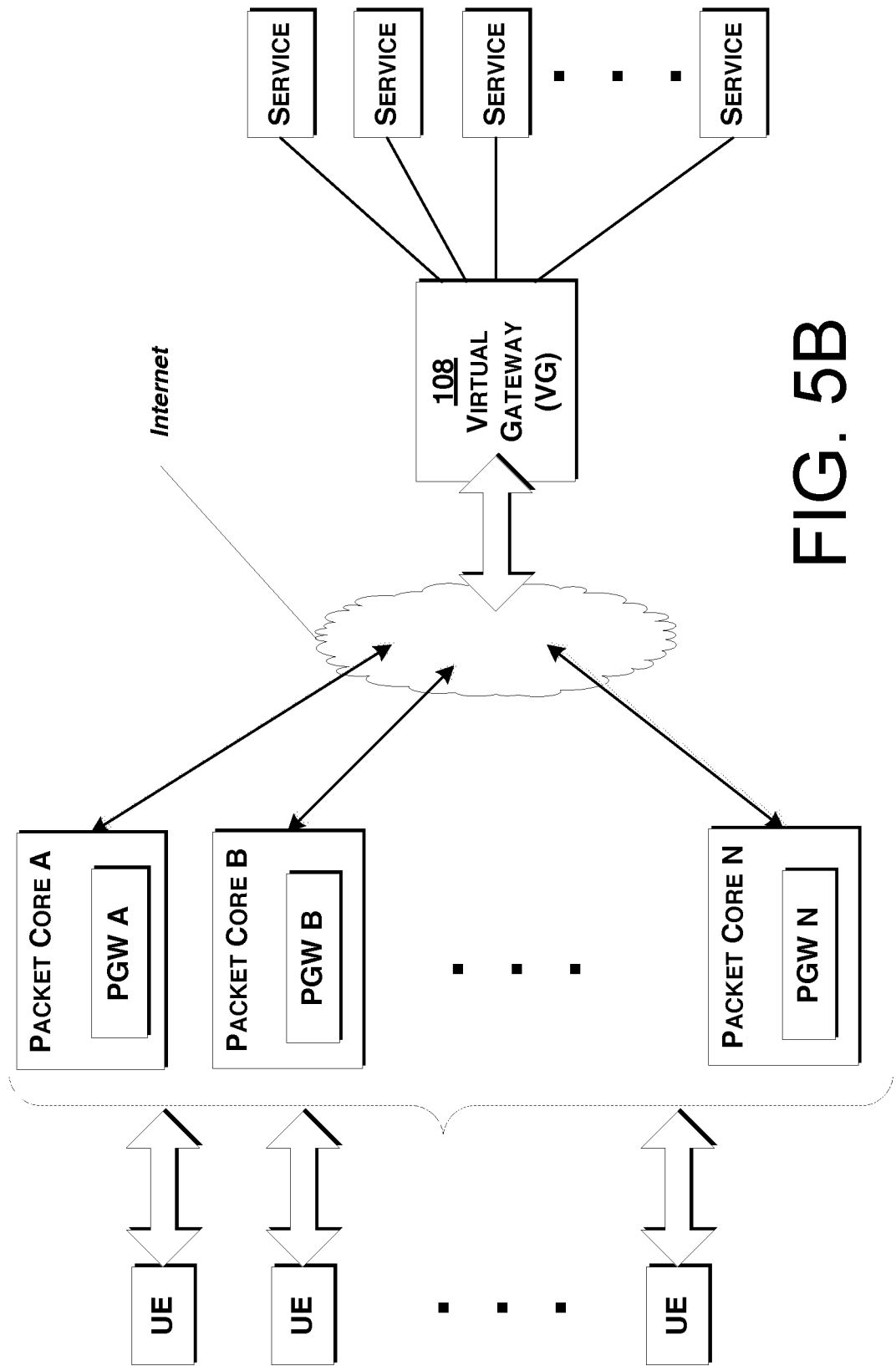

As seen in the example in FIGS. 5A-5B, the virtual gateway 108 may also connect to multiple services.

The above examples have been described with respect to a single UE. Those of ordinary skill in the art will appreciate and understand, upon reading this description, that, as shown in FIG. 5B, a virtual gateway according to exemplary embodiments hereof may support multiple UEs connected to multiple distinct packet cores and interacting with multiple services.

EXAMPLE USE CASES

Example 1

Bridging One or More "Accessible" Packet Cores and One or More "Non-Accessible" Packet Cores A person of ordinary skill in the art will recognize the method described here holds true for any combination of packet cores and that the total number of packet cores may be one or more. It is reasonable to assume that the wireless network associated with each mobile packet core may have overlapping coverage and that it costs the network operator different rates to send IP or IMS traffic through each network. However, the performance of one or both wireless networks associated with each packet core may not provide adequate service as determined by the network operator.

For this reason, the network operator may prefer to send traffic over the lower cost wireless network when both are available and can provide adequate service to a UE. The network operator desires a policy where an expensive packet core is used only when a lower-cost packet core cannot provide service considered adequate by the network operator.

As the UE moves geographically within the coverage areas of both networks, a desirable aggregation strategy involves a gradual transition in the IP routing according to the aforementioned policy. When the UE moves into a region with inadequate service on the lower-cost network, IP packets would gradually transition to the higher-cost but more accessible network. Similarly when on the network boundary of the low-cost network, packets may be duplicated along both routes to increase the probably of reception. As the UE transitions back into suitable coverage of the low-cost network, packets may be redirected to the packet core of the lower cost network. It should be clear to one skilled in the art that this method is transparent to the UE as it moves within the coverage areas of both networks.

Without the described invention, the UE would need to transition its primary ("default") IP session from the lower-cost packet core to the higher-cost packet core. Existing connections with the lower-cost packet core would have to be re-established, which could disrupt the data flow of applications on the UE. Given the nature of overlapping or adjacent coverage of two or more packet cores, a UE may find itself repeatedly switching between networks run by different packet cores. To a user experiencing content displayed on the UE, the disruption caused by switching between packet cores may result in an undesirable experience that would cause the human user to change wireless providers. The user may also disable connectivity to the lower-cost network.

With the described invention, packets are selectively routed by the virtual gateway to the appropriate packet core based on the aggregation policy. The virtual gateway therefore ensures all packets are routed according to the policy. The UE routes traffic through both packet cores to the virtual gateway, where the IP session is anchored. In this way, application-level traffic on the UE is unaware that multiple packet cores are utilized to carry traffic.

Example 2

Bridging Two or More Packet Cores that Share an Interface on a UE with a Single Radio of that Type By extension of the approach above, it is possible to perform the above policy-based routing procedure with a single interface. Consider the case of a wireless provider that has an MVNO agreement and its own small-cell network. That wireless provider would prefer to use its own small cells whenever they provide a suitable user experience and only fall back to the host MNO network otherwise. Due to limitations in the networking stack and cellular baseband, only one IP session may be maintained at a time on the UE.

Using a virtual gateway, IP continuity may be maintained for the UE when changing IP sessions. In the same method as example 1 above, the UE establishes an IP session with the virtual gateway that is used for routing through both packet cores. Both the small-cell packet core and the MNO packet core may be unified under the virtual IP session anchored in the virtual gateway. While the underlying IP sessions between the packets cores transition, the IP session is preserved by the virtual gateway.

Through the coordination traffic, the UE can make the transition parameters known to the virtual gateway, and the virtual gateway can act to coordinate this transition between the packet cores. Similarly, the virtual gateway can selectively route traffic designated for the UE through the appropriate packet core based on the defined policies of the virtual gateway operator (here, the wireless provider).

It should be noted that although this strategy does not use link aggregation for parallel transmission of packets, the IP sessions of virtual links are aggregated under the virtual IP session. Therefore, this solution still provides a more reliable connection and faster handoffs, via redundant transmission of packets through the packet cores from the virtual gateway to the UE whenever the UE is predicted to lose connectivity with one packet core.

Example 3

Bridging Two or More Packet Cores where at Least One Packet Core is Accessible

By extension of example 1 above, if one packet core is accessible to the network provider and another packet core is not, both packet cores may be bridged using a virtual gateway. The setup is the same as that of example 1. The network provider treats its own packet core as inaccessible and sets up a virtual gateway upstream from its own packet core. With access to the packet core, the provider may take steps to optimize the placement of the virtual gateway or aggregation policies. These optimizations include, but are not limited to, co-locating the virtual gateway with the accessible packet core and using policies that prefer the provider's packet core over those of others. The virtual gateway may also be combined with the functions of the accessible packet core such as the PGW, or combined with an eNodeB in the provider's network.

Example 4

Bridging Two or More Packet Cores where Multiple Radios are Used on the UE

Consider the case where a UE has two cellular radios. Again, the above network setup will work in substantially the same way as example 1. In this case however, the UE establishes an IP session with each packet core using the two independent cellular radios. A third virtual IP session is created between the UE and the virtual gateway.

Packets destined for the UE pass through the virtual gateway, and are routed based on the aggregation policy of the virtual gateway.

Example 5

Bridging Two or More Non-Accessible Packet Cores

By extension of the above examples, a virtual network operator may use steps from the aforementioned approach to bridge two or more inaccessible packet cores using a virtual gateway. The setup may be the same as the exemplary implementation. The virtual network operator may set up a virtual gateway on a public network such as the Internet. Without access to either packet core, an encapsulation system and method such as a GRE (generic routing encapsulation) tunnel may be used to route UE traffic through the inaccessible packet cores to the virtual gateway. The provider may optimize the placement of the virtual gateway or aggregation policies with respect to the packet cores. These optimizations may include, but are not limited to, co-locating the virtual gateway within a data center of one or both inaccessible packet cores and using scheduling policies that account for differences between each packet core such as cost, latency, and reliability. If said optimization is not possible, the operator may see similar benefits by placing the virtual gateway in a data center that is not co-located with the inaccessible packet cores.

In this example, the virtual gateway may be co-located with one or more of the packet cores.

Computing

The applications, services, mechanisms, operations and acts shown and described above may be implemented, at least in part, by software running on one or more computers or computer systems (e.g., virtual gateway (VG) 108 in FIGS. 2, 3, 5A, and 5B). It should be appreciated that each user device is, or comprises, a computer system.

Programs that implement such methods (as well as other types of data) may be stored and transmitted using a variety of media (e.g., computer readable media) in a number of ways. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 6:
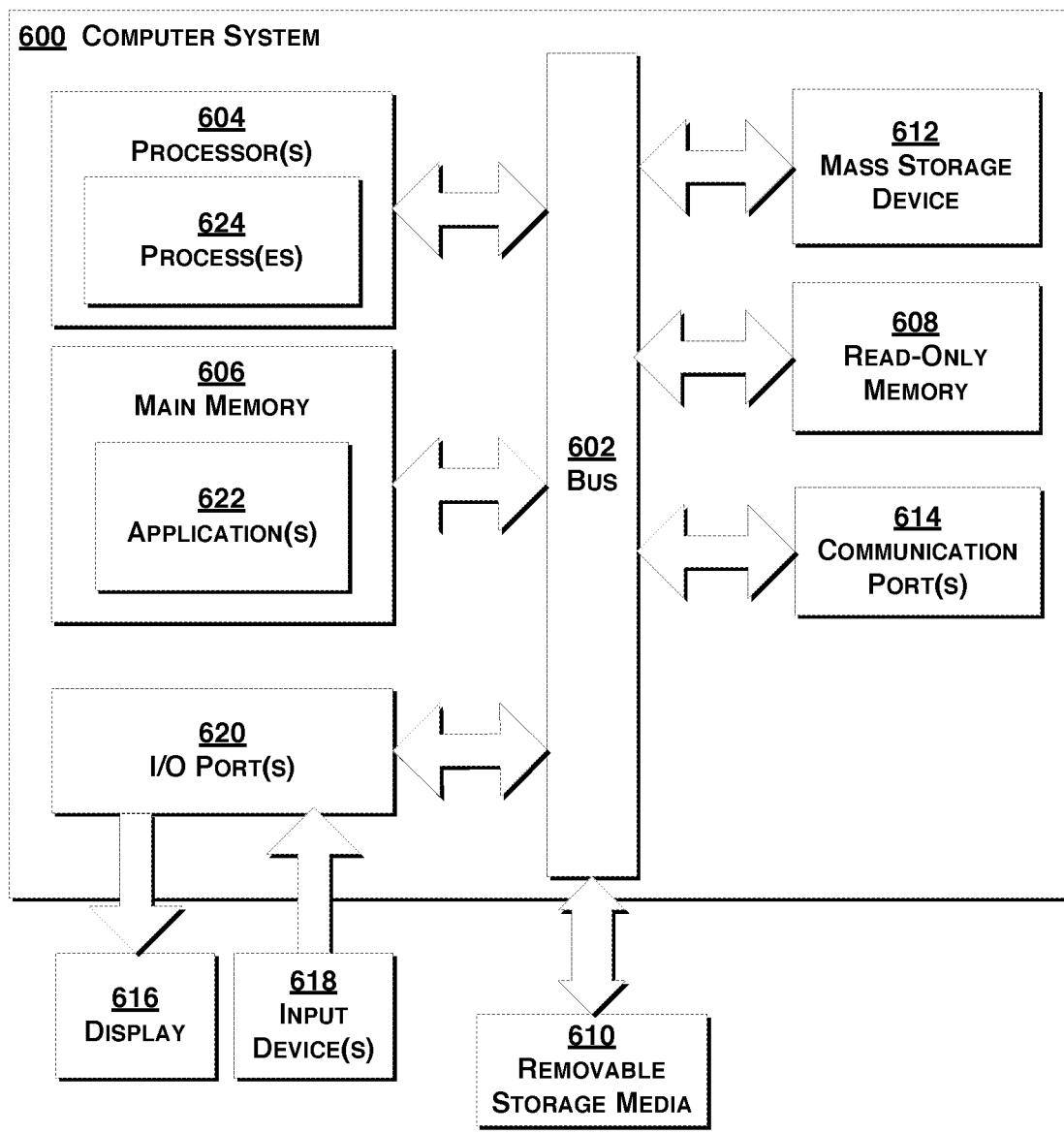
FIG. 6 depicts aspects of computing according to exemplary embodiments hereof.

FIG. 6 is a schematic diagram of a computer system 600 upon which embodiments of the present disclosure may be implemented and carried out.

According to the present example, a computer system 600 may include a bus 602 (i.e., interconnect), one or more processors 604, a main memory 606, read-only memory 608, optional removable storage media 610, mass storage 612, and one or more communications ports 614. Communication port(s) 614 may be connected to one or more networks (e.g., computer networks, cellular networks, etc.) by way of which the computer system 600 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 604 can be (or include) any known processor, such as, but not limited to, an Intel® Itanium® or Itanium 2® processor(s), AMD® Opteron® or Athlon MP® processor(s), or Motorola® lines of processors, and the like. Communications port(s) 614 can be any of an RS-232 port for use with a modem based dial-up connection, a 10/100 Ethernet port, a Gigabit port using copper or fiber, or a USB port, and the like. Communications port(s) 614 may be chosen depending on a network such as a Local Area Network (LAN), a Wide Area Network (WAN), a Content Delivery Network (CDN), or any network to which the computer system 600 connects. The computer system 600 may be in communication with peripheral devices (e.g., display 616, input device(s) 618) via Input/Output (I/O) port 620. Some or all of the peripheral devices may be integrated into the computer system 600, and the input device(s) 618 may be integrated into the display 616 (e.g., in the case of a touch screen).

Main memory 606 may be Random Access Memory (RAM), or any other dynamic storage device(s) commonly known in the art. Read-only memory 608 may be any static storage device(s) such as Programmable Read-Only Memory (PROM) chips for storing static information such as instructions for processor(s) 604. Mass storage 612 may be used to store information and instructions.

Bus 602 communicatively couples processor(s) 604 with the other memory, storage and communications blocks. Bus 602 can be a PCI/PCI-X, SCSI, a Universal Serial Bus (USB) based system bus (or other) depending on the storage devices used, and the like. Removable storage media 610 can be any kind of external hard-drives, Compact Disc-Read Only Memory (CD-ROM), Compact Disc-Re-Writable (CD-RW), Digital Versatile Disk-Read Only Memory (DVD-ROM), USB drives, etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves; light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 606 may encoded with application(s) 622 that support(s) the functionality as discussed herein (an application 622 may be an application that provides some or all of the functionality of one or more of the mechanisms described herein, e.g., the application(s)/mechanism(s) 302 of the virtual gateway 108). Application(s) 622 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 604 accesses main memory 606, e.g., via the use of bus 602 in order to launch, run, execute, interpret or otherwise perform the logic instructions of the application(s) 622. Execution of application(s) 622 produces processing functionality of the service(s) or mechanism(s) related to the application(s). In other words, the process(es) 624 represents one or more portions of the application(s) 622 performing within or upon the processor(s) 604 in the computer system 600.

For example, process(es) 624 may include device process(es) corresponding to one or more of the device application(s) 622.

It should be noted that, in addition to the process(es) 624 that carries(carry) out operations as discussed herein, other embodiments herein include the application 622 (i.e., the un-executed or non-performing logic instructions and/or data). The application 622 may be stored on a computer readable medium (e.g., a repository) such as a disk or in an optical medium. According to other embodiments, the application 622 can also be stored in a memory type system such as in firmware, read only memory (ROM), or, as in this example, as executable code within the main memory 606 (e.g., within Random Access Memory or RAM). For example, application 622 may also be stored in removable storage media 610, read-only memory 608, and/or mass storage device 612.

Those skilled in the art will understand that the computer system 600 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

Real Time

Those of ordinary skill in the art will realize and understand, upon reading this description, that, as used herein, the term "real time" means near real time or sufficiently real time. It should be appreciated that there are inherent delays in communication/control systems (e.g., based on distances), and these delays may cause delays in data reaching various system components. Inherent delays in the system do not change the real time nature of the data. In some cases, the term "real time data" may refer to data obtained in sufficient time to make the data useful for its intended purpose (e.g., control). Although the term "real time" has been used here, it should be appreciated that the system is not limited by this term or by how much time is actually taken for data to have an effect on control information.

Conclusion

It will be noted by someone skilled in the art that the above examples are not limited and serve to illustrate the different use cases of the method of the invention. Furthermore, it should be clear that transitions between the example network combinations mentioned and unmentioned network combinations obvious to one skilled in the art are natural extensions of the proposed method of packet core integration. For example, the above method applies when transitioning between a pair of accessible packet cores and a pair of non-accessible packet cores.

It should be appreciated that the words "first," "second," "third," and the like, in the description and claims are used to distinguish or identify, and not to show a serial or numerical limitation. Similarly, the use of letter or numerical labels (such as "(a)", "(b)", or "(i)", "(ii)", and the like) are used to help distinguish and/or identify, and not to show any serial or numerical limitation or ordering.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, the phrase "at least some" means "one or more," and includes the case of only one. Thus, e.g., the phrase "at least some ABCs" means "one or more ABCs", and includes the case of only one ABC.

No ordering is implied by any of the labeled boxes in any of the flow diagrams unless specifically shown and stated. When disconnected boxes are shown in a diagram the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A method in a computer network in which a user equipment (UE) connects to multiple packet cores, wherein at least one of the multiple packet cores is a non-accessible packet core, and wherein each of said multiple packet cores assigns the UE a corresponding network address, the method comprising:
   (A) a virtual gateway associating a first network address with said UE and providing the UE with a second network address for communicating with and/or through said virtual gateway, said first network address and said second network address being distinct from the network addresses assigned to the UE by the packet cores; and
   (B) said virtual gateway communicating with said UE via one or more of said multiple packet cores,
   wherein the virtual gateway and the UE communicate using the first network address and the second network address, and
   wherein the virtual gateway acts as a gateway for the UE, and
   wherein the UE forms a virtual network between the UE and the virtual gateway, and
   wherein the virtual network bridges connectivity of the multiple packet cores into a single virtual network connection.

2. The method of claim 1, wherein at least one of the multiple packet cores is an accessible packet core.

3. The method of claim 1, wherein the network addresses are Internet Protocol (IP) addresses.

4. The method of claim 1, wherein the multiple packet cores consist of exactly two packet cores.

5. The method of claim 1, wherein, in response to receipt of a packet from said UE, said packet intended for a particular service, said virtual gateway forwarding said packet to said particular service.

6. The method of claim 5, wherein said virtual gateway substitutes a destination network address with a network address of the particular service and substitutes a source address with a network address of the virtual gateway.

7. The method of claim 5, wherein, in response to receipt by the virtual gateway of an inbound packet from a service, said inbound packet intended for said UE, the virtual gateway translates a destination address of the inbound packet to correspond to a path via at least one of the multiple packet cores.

8. The method of claim 7, wherein the virtual gateway translates a destination address of the inbound packet to correspond to a path via one of the multiple packet cores.

9. The method of claim 7, wherein the path is selected based on at least one network policy.

10. The method of claim 9, wherein the at least one network policy changes in real time.

11. The method of claim 9, wherein the at least one network policy is based on one or more of: cost, throughput, reliability, jitter, latency, and packet loss.

12. The method of claim 1, wherein the first network address and the second network address are within an overlay network managed by the virtual gateway.

13. The method of claim 1, wherein the first network address is the same as the second network address.

14. The method of claim 1, wherein the multiple packet cores include a packet core supporting 3.5 GHz connectivity.

15. The method of claim 1, wherein the multiple packet cores include a cellular packet core.

16. The method of claim 1, wherein the virtual gateway is located in one of the multiple packet cores.

17. The method of claim 1, wherein the virtual gateway is located apart from the packet cores.

18. The method of claim 1, wherein the first network address and/or the second network address are public addresses.

19. A virtual gateway system comprising at least one server constructed and adapted to:
(a) associate a first network address with a user equipment (UE) and to provide the UE with a second network address for communicating with said virtual gateway, wherein each of a plurality of packet cores has assigned the UE a corresponding network address, and wherein said first network address and said second network address are distinct from any network addresses assigned to the UE by any packet cores; and
(b) communicate with said UE via one or more of said plurality of packet cores,
wherein the virtual gateway and the UE communicate using the first network address and the second network address, and
wherein the virtual gateway acts as a gateway for the UE, and
wherein the UE forms a virtual network between the UE and the virtual gateway, and
wherein the virtual network bridges connectivity of the plurality of packet cores into a single virtual network connection, and
wherein at least one of the plurality of packet cores is a non-accessible packet core.

20. The system of claim 19, wherein at least one of the plurality of packet cores is an accessible packet core.

21. The system of claim 19, wherein the network addresses are Internet Protocol (IP) addresses.

22. The system of claim 19, wherein the plurality of packet cores consists of exactly two packet cores.

23. The system of claim 19, wherein said at least one server is further constructed and adapted to, in response to receipt of a packet from said UE, said packet intended for a particular service, forward said packet to said particular service.

24. The system of claim 23, wherein said at least one server is further constructed and adapted to substitute a destination network address with a network address of the particular service and to substitute a source address with a network address of the virtual gateway.

25. The system of claim 23, wherein said at least one server is further constructed and adapted to, in response to receipt by the virtual gateway of an inbound packet from a service, said inbound packet intended for said UE, translate a destination address of the inbound packet to correspond to a path via at least one of the plurality of packet cores.

26. The system of claim 25, wherein the virtual gateway translates a destination address of the inbound packet to correspond to a path via one of the plurality of packet cores.

27. The system of claim 25, wherein the path is selected based on at least one network policy.

28. The system of claim 27, wherein the at least one network policy changes in real time.

29. The system of claim 27, wherein the at least one network policy is based on one or more of: cost, throughput, reliability, jitter, latency, and packet loss.

30. The system of claim 19, wherein the first network address and the second network address are within an overlay network managed by the virtual gateway.

31. The system of claim 19, wherein the first network address is the same as the second network address.

32. The system of claim 19, wherein the plurality of packet cores includes a packet core supporting 3.5 GHz connectivity.

33. The system of claim 19, wherein the plurality of packet cores includes a cellular packet core.

34. The system of claim 19, wherein the virtual gateway is located in one of the plurality of packet cores.

35. The system of claim 19, wherein the virtual gateway is located apart from the packet cores.

36. The system of claim 19, wherein the first network address and/or the second network address are public addresses.

37. A computer program product having computer readable instructions stored on non-transitory computer readable media, the computer readable instructions including instructions for implementing a computer-implemented method,
in a computer network in which a user equipment (UE) connects to multiple packet cores, wherein at least one of the multiple packet cores is a non-accessible packet core, and wherein each of said multiple packet cores assigns the UE a corresponding network address,
said method comprising:
(A) a virtual gateway associating a first network address with said UE and providing the UE with a second network address for communicating with and/or through said virtual gateway, said first network address and said second network address being distinct from the network addresses assigned to the UE by the packet cores; and
(B) said virtual gateway communicating with said UE via one or more of said multiple packet cores,
wherein the virtual gateway and the UE communicate using the first network address and the second network address, and
wherein the virtual gateway acts as a gateway for the UE, and
wherein the UE forms a virtual network between the UE and the virtual gateway, and
wherein the virtual network bridges connectivity of the multiple packet cores into a single virtual network connection.

38. The method of claim 1, wherein the single virtual network connection comprises an aggregated IP flow between the UE and virtual gateway.

39. The virtual gateway system of claim 19, wherein the single virtual network connection comprises an aggregated IP flow between the UE and virtual gateway.

40. The computer program product of claim 37, wherein the single virtual network connection comprises an aggregated IP flow between the UE and virtual gateway.

* * * * *